(12) United States Patent
Ablabutyan et al.

(10) Patent No.: US 7,857,573 B2
(45) Date of Patent: Dec. 28, 2010

(54) CART STOP

(75) Inventors: Karapet Ablabutyan, Glendale, CA (US); Aida Sahakyan, Glendale, CA (US)

(73) Assignee: Maxon Industries, Inc., Santa Fe Springs, CA (US)

( * ) Notice: Subject to any disclaimer, the term of this patent is extended or adjusted under 35 U.S.C. 154(b) by 435 days.

(21) Appl. No.: 11/670,956

(22) Filed: Feb. 2, 2007

(65) Prior Publication Data

US 2008/0184524 A1 Aug. 7, 2008

(51) Int. Cl.
*B60P 1/00* (2006.01)
(52) U.S. Cl. .................... 414/545; 414/540
(58) Field of Classification Search ............... 16/231, 16/232, 286, 374; 414/540, 545
See application file for complete search history.

(56) References Cited

U.S. PATENT DOCUMENTS

| | | | | | |
|---|---|---|---|---|---|
| 2,702,651 | A | * | 2/1955 | Graham | 220/827 |
| 3,233,767 | A | * | 2/1966 | Goodacre | 414/495 |
| 3,539,802 | A | * | 11/1970 | Garnett et al. | 362/434 |
| 3,870,126 | A | * | 3/1975 | Himes | 187/403 |
| 5,683,221 | A | * | 11/1997 | Ablabutyan | 414/540 |
| 7,258,386 | B2 | * | 8/2007 | Leitner | 296/97.22 |
| 7,407,352 | B2 | * | 8/2008 | Wilson | 410/19 |
| 2002/0130531 | A1 | * | 9/2002 | Leitner | 296/97.22 |

* cited by examiner

*Primary Examiner*—Saúl J Rodríguez
*Assistant Examiner*—Joshua I Rudawitz
(74) *Attorney, Agent, or Firm*—Michael Zarrabian, Esq.; Myers Andras Sherman & Zarrabian LLP

(57) ABSTRACT

A cart stop suitable for use with a lift platform is described. The cart stop has a closed position which allows a cart or other wheeled device to move over it. The cart stop also has an open position which prevents the cart or other wheeled device from rolling off of the lift platform.

19 Claims, 6 Drawing Sheets

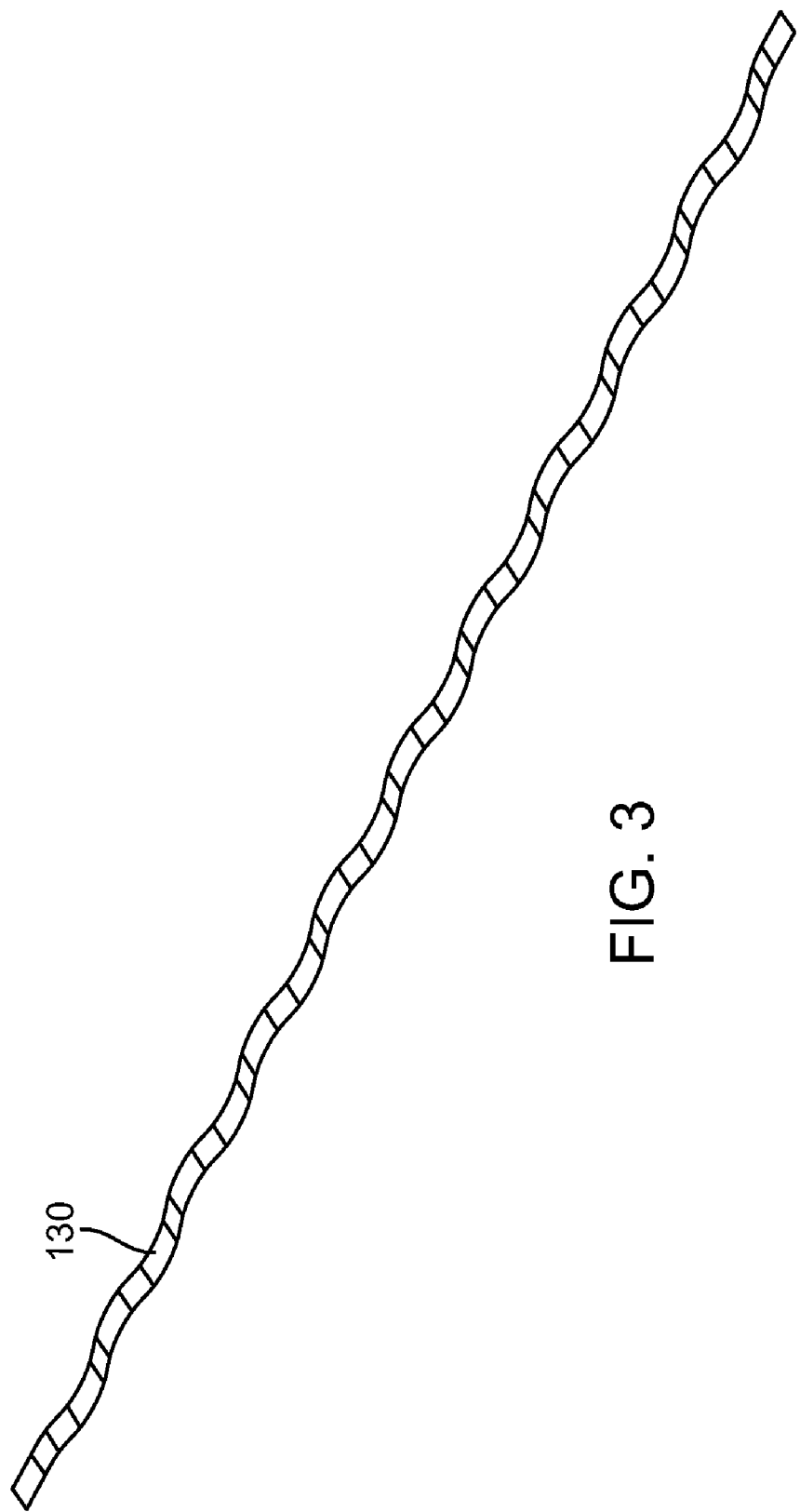

CART STOP

BACKGROUND

Lift platforms are used to raise and lower loads to and from a vehicle bed. Lift platforms are often used to carry a cart or other wheeled device. In this case, it is desirable to have a cart stop to prevent the cart or other wheeled device from rolling off the lift platform when the lift platform is in motion or not level.

BRIEF DESCRIPTION OF THE DRAWINGS

FIG. 3 shows one embodiment of a spring device suitable for use with the cart stop of the present invention.

DETAILED DESCRIPTION OF PREFERRED EMBODIMENTS OF THE INVENTION

Figure 1A:
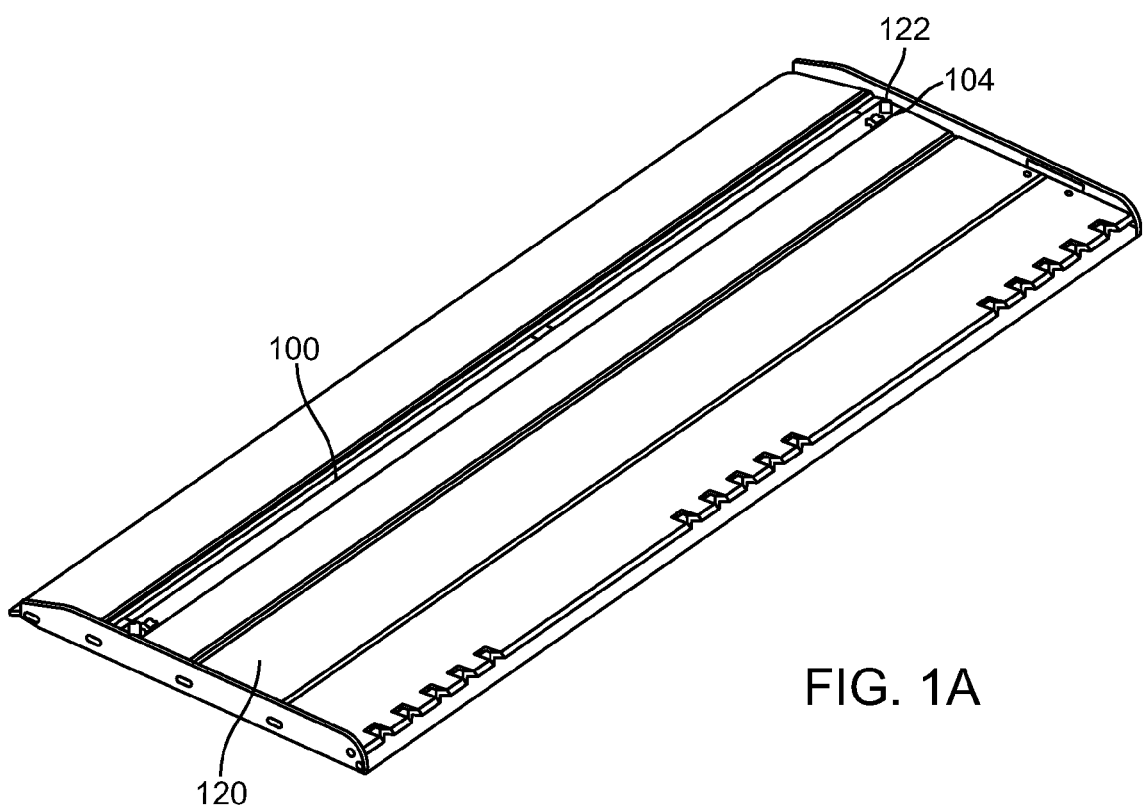
FIGS. 1A-1B show one embodiment of a cart stop in accordance with the present invention.
Figure 1B:
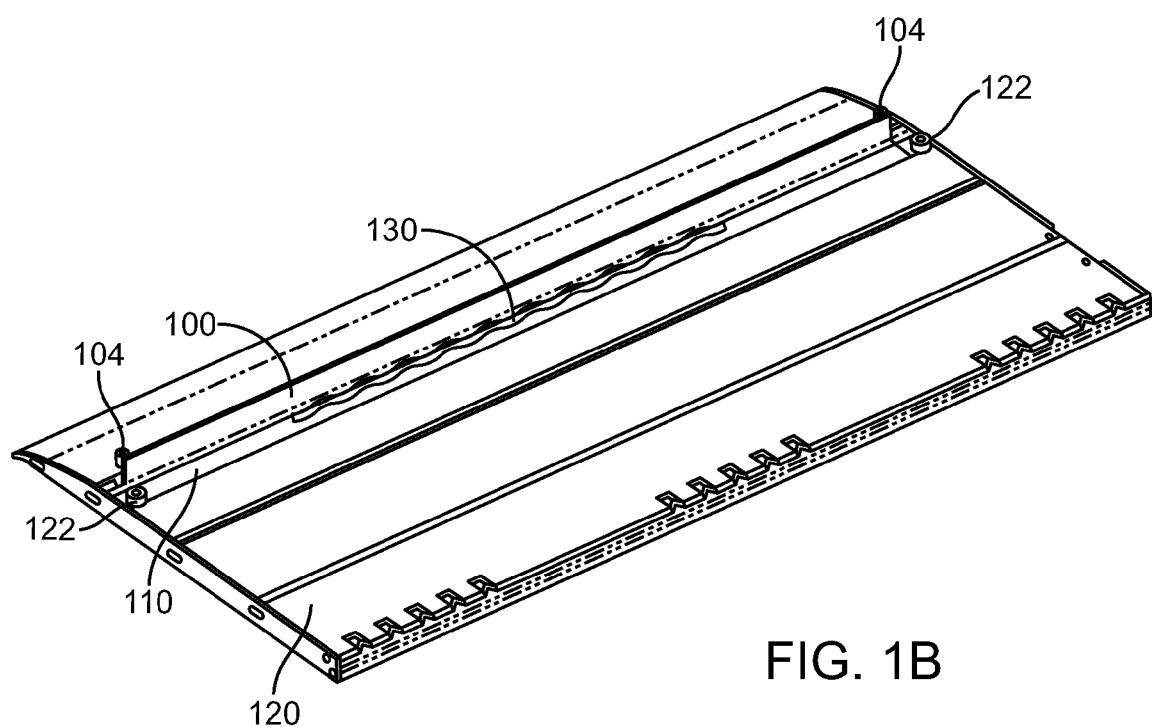

FIGS. 1A-1B show one embodiment of a cart stop in accordance with the present invention. Cart stop 100 is at least partially located in a channel 110 in a platform 120. Cart stop 100 moves between a closed position shown in FIG. 1A and an open position shown in FIG. 1B. Cart stop 100 in the closed position is substantially flat with platform 120. Cart stop 100 in the open position may be in any position or angle other than substantially flat with platform 120.

In the closed position, cart stop 100 may be configured so that it does not extend beyond an upper surface of platform 120. This allows carts and other wheeled devices to move over cart stop 100 in the closed position. In the open position, cart stop 100 serves to prevent a cart or other wheeled device from rolling off of platform 120 when platform 120 is in use or not level.

In one embodiment, cart stop 100 may have a toe flip 104 which extends above an upper surface of platform 120 when cart stop 100 is in the closed position. Toe flip 104 is suitably configured so that it can be used to flip open cart stop 100 when cart stop 100 is in the closed position. More than one toe flip 104 may be used with cart stop 100. For example, cart stop 100 may have a toe flip 104 on each end of cart stop 100. In another embodiment; toe flip 104 may extend from the side of platform 120, without extending above an upper surface of platform 120 when cart stop 100 is in the closed position.

Figure 1C:
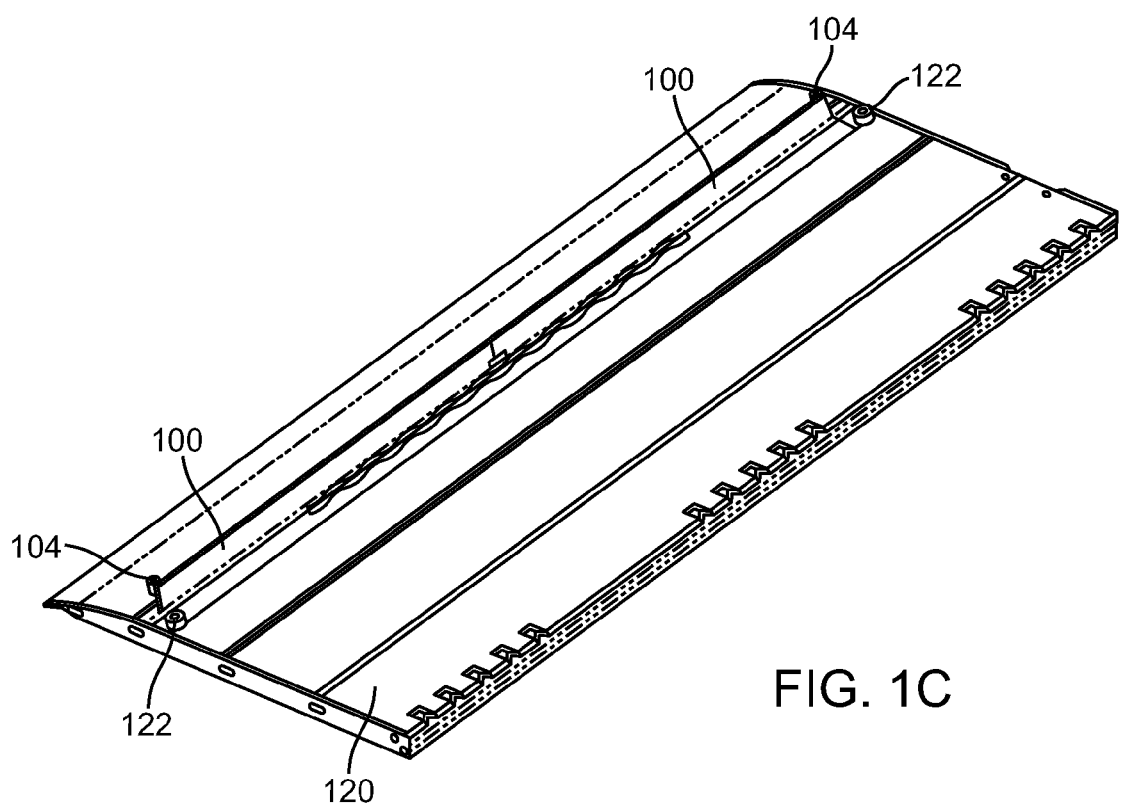
FIG. 1C shows another embodiment of a cart stop in accordance with the present invention.

In the embodiment shown in FIGS. 1A and 1B, cart stop 100 extends substantially the width of platform 120. FIG. 1C shows another embodiment of cart stop 100 in accordance with the present invention. In this embodiment, cart stop 100 has two segments, each of which extends about half the width of platform 120. Each segment may be independently opened and closed. Alternatively, each segment may be independently opened and/or closed, but closing or opening either segment will also close or open the other segment. Each segment may have a toe flip 104. Cart stop 100 may also have more than two segments.

Platform 120 is suitable for use with a wide variety of lifts and lifting devices. Platform 120 may include one or more foldable sections. When platform 120 includes foldable sections, bumpers 122 may used to prevent cart stop 100 in the open position and/or toe flip 104 from striking another section of platform 120 when platform 120 is folded.

Figure 2A:
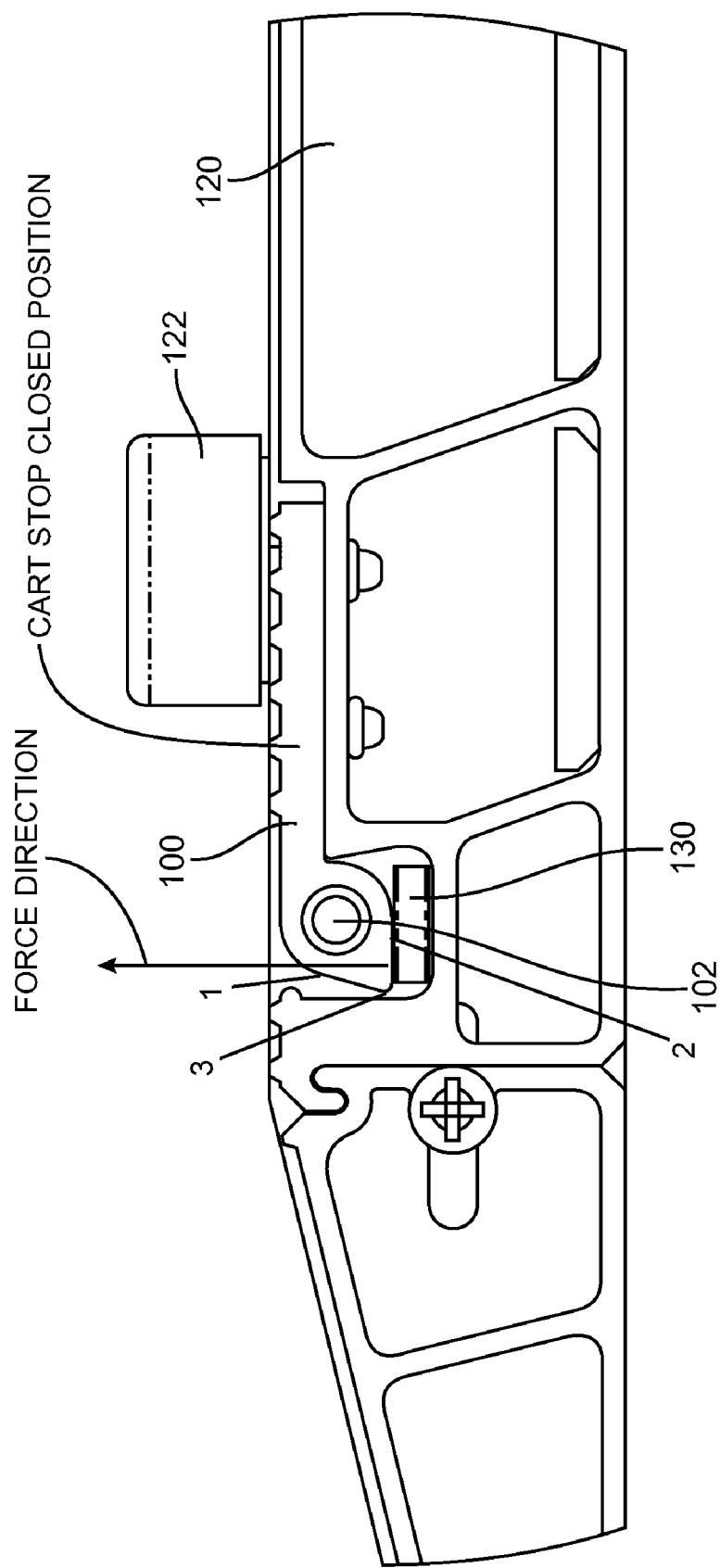
FIGS. 2A-2B show a cross-sectional view of one embodiment of a cart stop in accordance with the present invention.
Figure 2B:
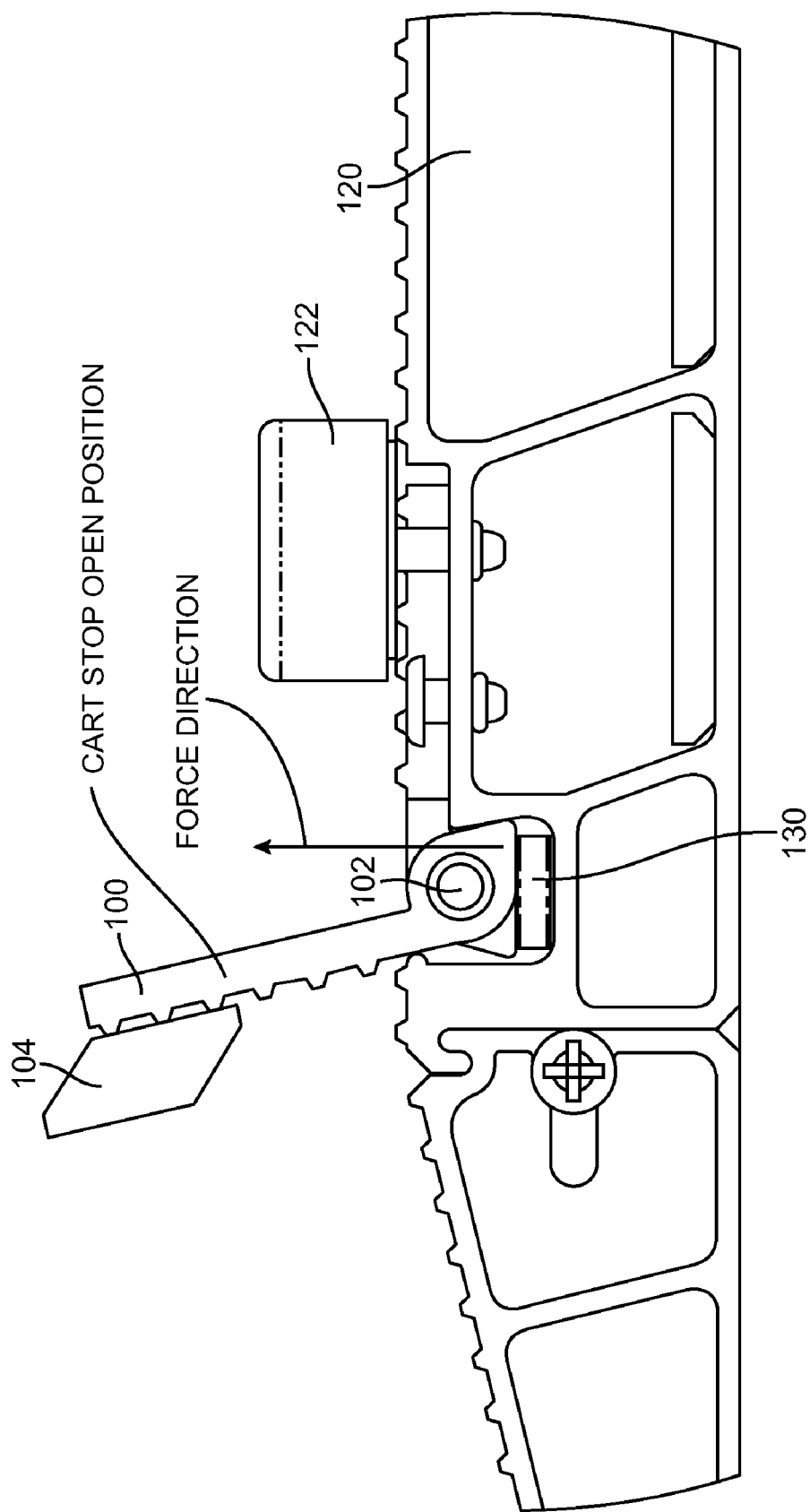

FIGS. 2A-2B show a cross-sectional view of one embodiment of a cart stop in accordance with the present invention. Cart stop 100 rotates about a pin 102. Channel 110 is suitably configured to accommodate cart stop 100. In one embodiment, a spring device 130 is located in a space at the bottom of channel 110 and is in contact with cart stop 100. Cart stop 100 has surfaces which, along with spring device 130, bias cart stop 100 in either the open position or closed position. In one embodiment, cart stop 100 has a profile with two substantially flat surfaces 1 and 2 corresponding to the open position and the closed position, respectively, and a pointed section 3 therebetween which serves to deform spring device 130 when cart stop 100 is moved between the open position and the closed position. In another embodiment, cart stop 100 has a cam-like profile. Through the selection of a suitable profile for cart stop 100 and a suitable spring rate for spring device 130, a desired force can be selected necessary to move cart stop 100 between the open position and the closed position. Spring device 130 may also be located at the rear, side, or any other suitable location in channel 110. Spring device 130 may be positioned horizontally or vertically in channel 110.

Spring device 130 serves to prevent cart stop 100 from inadvertently closing when cart stop 100 is in the open position. Spring device 130 also serves to prevent cart stop 100 from inadvertently opening when cart stop 100 is in the closed position. Spring device 130 also serves to prevent cart stop 100 from rattling or shaking when cart stop 100 is in the closed position.

To reduce the forces acting on pin 102 when an object presses against cart stop 100, clearance may be designed around pin 102 which allows cart stop 100 to "float" and stop up against a side of channel 110.

FIG. 3 shows one embodiment of a spring device 130 suitable for use with the cart stop of the present invention. Spring device 130 has a profile that resembles a wave. Spring device 130 may be made of steel, aluminum, or any other suitable material. Spring device 130 may have substantially the same length as the width of platform 120, or may be shorter. By changing with length of spring device 130, and thus the number of "waves" in spring device 130, the force necessary to open or close cart stop 100 can be modified. Spring device 130 may be a single leaf spring. Spring device 130 may be retained by the configuration of cart stop 100 and channel 110. Spring device 130 may be substantially the same width as channel 110.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

What is claimed is:

1. An apparatus for carrying a load to and from a vehicle bed, the apparatus comprising:
    a lift platform defining a channel;
    a cart stop member at least partially located in the channel, the cart stop member being rotatably coupled to the lift platform, the cart stop member having an open position and a closed position relative to the lift platform, the cart stop member being substantially level with an upper surface of the lift platform when the cart stop member is in the closed position;

the cart stop member having a first substantially flat surface corresponding to the open position, and a second substantially flat surface corresponding to the closed position; and a spring device biased against the first substantially flat surface when the cart stop member is in the open position, the spring device biased against the second substantially flat surface when the cart stop member is in the closed position;

wherein the spring device comprises an elongate spring having a substantially wave-like profile along a lengthwise axis thereof that extends along the channel, the spring exerting an essentially linear biasing force against said substantially flat surfaces of the cart stop member, wherein the direction of the linear biasing force is substantially orthogonal to said lengthwise axis along the wave-like profile of the spring.

2. The apparatus of claim 1, wherein the lengthwise axis of the spring along the substantially wave-like profile extends in the channel parallel to the upper surface of the lift platform and parallel to a bottom of the channel, such that the spring contracts along said lengthwise axis to exert said biasing force.

3. The apparatus of claim 2, wherein the spring device is located at a bottom of the channel.

4. The apparatus of claim 1, wherein the lift platform includes a plurality of foldable sections.

5. The apparatus of claim 1, further comprising:
a toe flip directly attached to the cart stop member such that the toe flip rotates and moves together with the cart stop member relative to the lift platform, the toe flip extending above an upper surface of the lift platform when the cart stop member is in the closed position, the toe flip configured to allow the cart stop member to be moved from the open position to the closed position upon exerting a first force on the toe flip to rotate the toe flip and the cart stop member together towards the lift platform, and to allow the cart stop member to be moved from the closed position to the open position upon exerting a second force on the toe flip, opposite in direction to the first force, to rotate the toe flip and the cart stop member together away from the lift platform, wherein the toe flip rotates with the cart stop member between the open and closed positions.

6. The apparatus of claim 5, wherein the lift platform includes spacers which prevent the cart stop member and/or the toe flip from striking the foldable sections.

7. The apparatus of claim 5, wherein the first substantially flat surface and the second substantially flat surface rotate with the cart stop member relative to the lift platform.

8. The apparatus of claim 7, wherein:
in the open position of the cart stop member, the spring device is biased against the first substantially flat surface of the cart stop member, maintaining the cart stop member in the open position, wherein in the open position, the cart stop member blocks cart wheels from rolling over the cart stop member and off said upper surface of the lift platform; and
in the closed position of the cart stop member, the spring device is biased against the second substantially flat surface of the cart stop member, maintaining the cart stop member in the closed position, wherein in the closed position the cart stop member allows cart wheels to roll over the cart stop member and off said upper surface of the lift platform.

9. The apparatus of claim 8, wherein the cart stop member further comprises a protrusion between the first and second substantially flat surfaces, the protrusion deforming the spring device when the cart stop member is rotated between the open position and the closed position, such that when the spring is deformed by said protrusion during rotation of the cart stop member, the spring expands in the channel along the lengthwise axis of the spring.

10. The apparatus of claim 9, wherein the lift platform includes spacer means which prevent the cart stop member and/or the toe flip from striking the foldable sections.

11. An apparatus for carrying a load to and from a vehicle bed, the apparatus comprising:
a lift platform defining a channel;
a cart stop member at least partially located in the channel, the cart stop member being rotatably coupled to the lift platform, the cart stop member having an open position and a closed position, the cart stop member being substantially level with an upper surface of the lift platform when the cart stop member is in the closed position, the cart stop member having a first substantially flat surface corresponding to the open position, and a second substantially flat surface corresponding to the closed position; and
a spring means biased against the first substantially flat surface when the cart stop member is in the open position maintaining the cart stop member in the open position, the spring means biased against the second substantially flat surface when the cart stop member is in the closed position maintaining the cart stop member in the closed position, wherein the spring means comprises an elongate spring having a substantially wave-like profile along a lengthwise axis thereof that extends along the channel, the spring exerting an essentially linear biasing force against said substantially flat surfaces of the cart stop member, wherein the direction of the linear biasing force is substantially orthogonal to said lengthwise axis along the wave-like profile of the spring;
wherein the cart stop member further has a protruding section between the first and second substantially flat surfaces, the protruding section deforming the spring means when the cart stop member is rotated between the open position and the closed position, wherein the first substantially flat surface and the second substantially flat surface rotate with the cart stop member relative to the lift platform.

12. The apparatus of claim 11, wherein the lengthwise axis of the spring means along the substantially wave-like profile extends in the channel parallel to the upper surface of the lift platform and parallel to a bottom of the channel, such that the spring means contracts along said lengthwise axis to exert said biasing force.

13. The apparatus of claim 12, wherein the spring means is located at a bottom of the channel.

14. The apparatus of claim 11, wherein the lift platform includes a plurality of foldable sections.

15. An apparatus for carrying a load to and from a vehicle bed, the apparatus comprising:
a lift platform defining a channel;
a cart stop member at least partially located in the channel, the cart stop member being rotatably coupled to the lift platform, the cart stop member having an open position and a closed position relative to the lift platform, the cart stop member being substantially level with an upper surface of the lift platform when the cart stop member is in the closed position;
the cart stop member comprising a plate element having an upper portion and a lower portion, the lower portion having a first substantially flat surface corresponding to the open position, and a second substantially flat surface corresponding to the closed position, the plate element being rotatably coupled to the lift platform via a pivot wherein the lower portion of the plate element is at least partially located in the channel; and a spring device biased against the first substantially flat surface when the cart stop member is in the open position, the spring device biased against the second substantially flat surface when the cart stop member is in the closed position, wherein the spring device comprises an elongate spring having a substantially wave-like profile along a lengthwise axis thereof that extends along the channel, the spring exerting an essentially linear biasing force against said substantially flat surfaces of the cart stop member, wherein the direction of the linear biasing force is substantially orthogonal to said lengthwise axis along the wave-like profile of the spring.

16. The apparatus of claim 15, wherein the lengthwise axis of the spring device along the substantially wave-like profile extends in the channel parallel to the upper surface of the lift platform and parallel to a bottom of the channel, such that the spring contracts along said lengthwise axis to exert said biasing force.

17. The apparatus of claim 15, wherein:

the spring device is biased against the first substantially flat surface when the cart stop member is in the open position, maintaining the cart stop member in the open position; and the spring device is biased against the second substantially flat surface when the cart stop member is in the closed position, maintaining the cart stop member in the closed position.

18. The apparatus of claim 17, wherein the first substantially flat surface and the second substantially flat surface rotate with the cart stop member relative to the lift platform.

19. The apparatus of claim 18, wherein:

the cart stop member plate element further has a protruding section between the first and second substantially flat surfaces, the protruding section deforming the spring device when the cart stop member is rotated between the open position and the closed position; and the cart stop member plate element further has a toe flip portion such that the toe flip rotates and moves together with the cart stop member plate element relative to the lift platform, the toe flip portion extending above an upper surface of the lift platform when the cart stop member plate element is in the closed position, the toe flip portion configured to allow the cart stop member plate element to be moved from the open position to the closed position upon exerting a first force to the toe flip portion to rotate the toe flip portion and the cart stop member plate element together towards the lift platform, and to allow the cart stop member plate element to be moved from the closed position to the open position upon exerting a second force to the toe flip portion, opposite in direction to the first force, to rotate the toe flip portion and the cart stop member plate element together away from the lift platform, wherein the toe flip portion rotates with the cart stop member plate element between the open and closed positions.

\* \* \* \* \*